United States Patent
Midya et al.

(10) Patent No.: US 9,768,705 B1
(45) Date of Patent: Sep. 19, 2017

(54) MULTIBRIDGE POWER CONVERTER FOR AC MAINS

(71) Applicant: TSi Power Corp., Antigo, WI (US)

(72) Inventors: Pallab Midya, Palatine, IL (US); Robert S Schneider, Middleton, WI (US); Peter Nystrom, Antigo, WI (US)

(73) Assignee: TSi Power Corp., Antigo, WI (US)

( * ) Notice: Subject to any disclaimer, the term of this patent is extended or adjusted under 35 U.S.C. 154(b) by 0 days.

(21) Appl. No.: 15/288,484

(22) Filed: Oct. 7, 2016

(51) Int. Cl.
*H02M 5/45* (2006.01)
*H02M 5/44* (2006.01)

(52) U.S. Cl.
CPC .................................... *H02M 5/44* (2013.01)

(58) Field of Classification Search
CPC ............ H02M 5/00; H02M 5/40; H02M 5/42; H02M 5/48; H02M 5/46; H02M 5/44; H02M 5/443; H02M 5/447; H02M 5/45; H02M 5/4505; H02M 5/451; H02M 5/452; H02M 5/453; H02M 5/458; H02M 5/4585
USPC ......... 363/34, 35, 36, 37, 39, 45, 46, 47, 48
See application file for complete search history.

(56) References Cited

U.S. PATENT DOCUMENTS

| | | | |
|---|---|---|---|
| 4,845,605 A * | 7/1989 | Steigerwald | H02M 3/3376 363/21.03 |
| 6,118,676 A | 9/2000 | Divan | |
| 7,920,392 B2 | 4/2011 | Schneider | |
| 2008/0013351 A1* | 1/2008 | Alexander | H02M 3/1582 363/123 |
| 2008/0284367 A1* | 11/2008 | Kawashima | H02M 1/126 318/700 |

OTHER PUBLICATIONS

Bhaskar P.Prasad, Muqthiar S.Ali, Sai M.Subrahmanyam, Compensation of sag by using transformerless active voltage boost circuit, International Conference on Emerging Trends in Science Technology Engineering and Management, Oct. 9 & 10, 2015.

* cited by examiner

*Primary Examiner* — Yemane Mehari
*Assistant Examiner* — Alex Torres-Rivera
(74) *Attorney, Agent, or Firm* — Patents and Licensing LLC; Daniel W. Juffernbruch

(57) ABSTRACT

An AC power converter converts power from an AC power source to an AC load. A DC power holding source is coupled to an input half-bridge switch, a common half-bridge switch and an output half-bridge switch. A controller is coupled to the input half-bridge switch, the common half-bridge switch, and an output half-bridge switch to generate at least two control signals at a common switching frequency, wherein the controller generates the at least two control signals with a phase difference there between chosen to cause a ripple frequency in both the input low pass filter and the output low pass filter to be double the common switching frequency. An input low pass filter can eliminate switching frequency energy from entering the AC power source. An output low pass filter can eliminate switching frequency energy from entering the AC load.

18 Claims, 13 Drawing Sheets

MULTIBRIDGE POWER CONVERTER FOR AC MAINS

BACKGROUND OF THE INVENTION

1. Technical Field

The present inventions relate to a multi-bridge power converter and, more particularly, relate to a multi-bridge power converter for creating an AC mains power supply for large power loads.

2. Description of the Related Art

AC voltage regulation, voltage sag and voltage surge correction are a proven need for today's commercial and industrial utility power grid users. Centralized power generation cannot prevent local brown outs and outages which are best mitigated at the point of use. A variety of solutions employ power converters, energy storage devices and controls to correct for these disturbances. Economic benefits over the related art may be realized by eliminating or reducing the size of magnetic components and semiconductors and increasing energy efficiency.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE DRAWINGS

Figure 1:
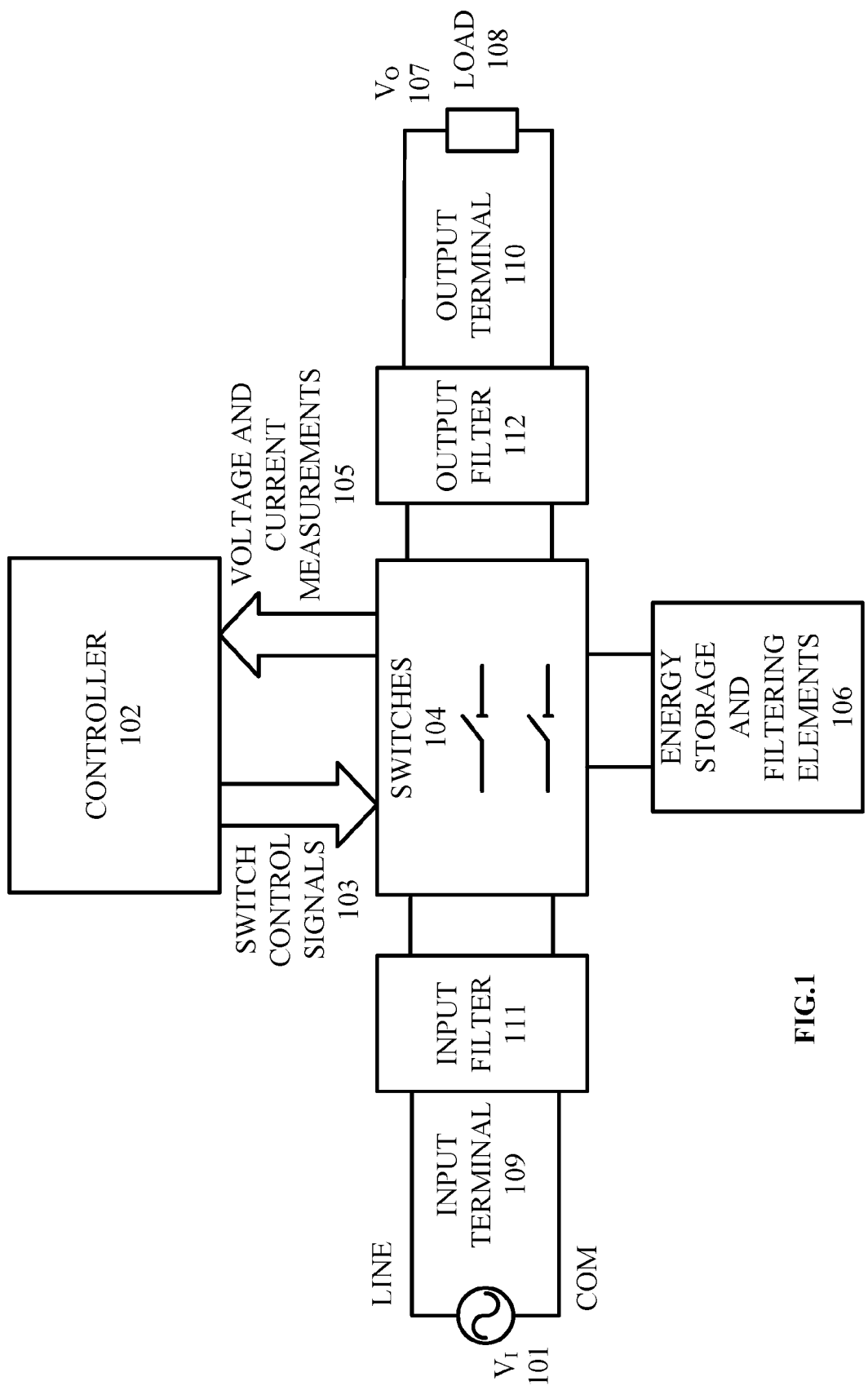
FIG. 1 illustrates a block diagram of the overall system according to embodiments of the present inventions.

FIG. 1 illustrates a block diagram of the overall system with Controller, $V_I$, $V_O$, Switches, Filters including L & C, energy storage elements and load according to embodiments of the present inventions. The AC source 101 ($V_I$) provides line LINE and common COM outputs as illustrated in FIG. 1. The Controller 102 controls the power taken from AC Source $V_I$ 101 to provide desired power to Load 108 according to embodiments of the present inventions. FIG. 1 illustrates a controller, $V_I$, $V_O$, switches, filters and energy storage elements like L and C. The AC Source $V_I$ 101 powers the Load 108 with varying output using the controller 102. Controller 102 takes input from switches 104 and filters 111, 112 in the form of voltage and current measurements 105 and generate output in the form of switch control signals 103 which control the switches 104. Energy storage elements 106 are connected to Switches 104. Output voltage node $V_O$ 107 is connected to output filter and the Load 108. By using passive or active devices and novel switching algorithms, the present invention maintains a DC bus voltage at basically half that of the prior art.

The switches 104 provide an input half-bridge switch, a common half-bridge switch, and an output half-bridge switch. The input half-bridge switch and the common half-bridge are operatively coupled to the DC power holding source. The output half-bridge switch is operatively coupled to a DC power holding source within the energy storage elements 106.

The controller 102 is coupled to at least two of the input half-bridge switch, the common half-bridge switch, and the an output half-bridge switch to generate at least two control signals at a common switching frequency, wherein the controller generates at least two control signals with a phase difference there between chosen to cause a ripple frequency in both the input low pass filter and the output low pass filter to be double the common switching frequency.

The system includes an input low pass filter 111 and an output low pass filter 112. The input low pass filter is operatively coupled to the input terminal of the AC Source 109 and has filter characteristics to eliminate switching frequency energy from entering the AC power source $V_I$ 101. The output low pass filter is operatively coupled to the output half-bridge switch of the switches 104 and has filter characteristics to eliminate the common switching frequency energy from entering the AC load 108.

It is desired that the common switching frequency is chosen low enough to achieve the highest efficiency. When the switching frequency of the common half-bridge switch is the same as the switching frequency of the output half-bridge switch, its fundamental frequency is cancelled and only harmonics of the fundamental switching frequency are present particularly in inductor currents of the system. Also, when the switching frequency of the common half-bridge switch is the same as the switching frequency of the input half-bridge switch, the fundamental switching frequency is cancelled and only harmonics of the fundamental switching frequency are present particularly in the inductor currents of the system. Audible noise is thus cancelled. For example, when the half-bridge switches are operated at 10 kHZ, the inductor currents are inaudible harmonics at 20 kHZ and above.

In some embodiments the controller 102 generates a common half-bridge switch control signal operatively coupled to the common half-bridge switch to switch the common half-bridge switch.

In other embodiments the controller 102 generates three control signals 103 comprising an input half-bridge switch control signal operatively coupled to switch the input half-bridge switch, a common half-bridge switch control signal operatively coupled to switch the common half-bridge switch, and an output half-bridge switch control signal operatively coupled to switch the output half-bridge switch. The controller 102 generates the input half-bridge switch control signal and the common half-bridge switch control signal with a phase difference there between chosen to cause a ripple frequency in both the input low pass filter 111 and the output low pass filter 112 to be double the common switching frequency. The controller 102 generates the common half-bridge switch control signal and the output half-bridge switch control signal with a phase difference there between chosen to cause a ripple frequency in both the input low pass filter and the output low pass filter to be double the common switching frequency.

Figure 2:
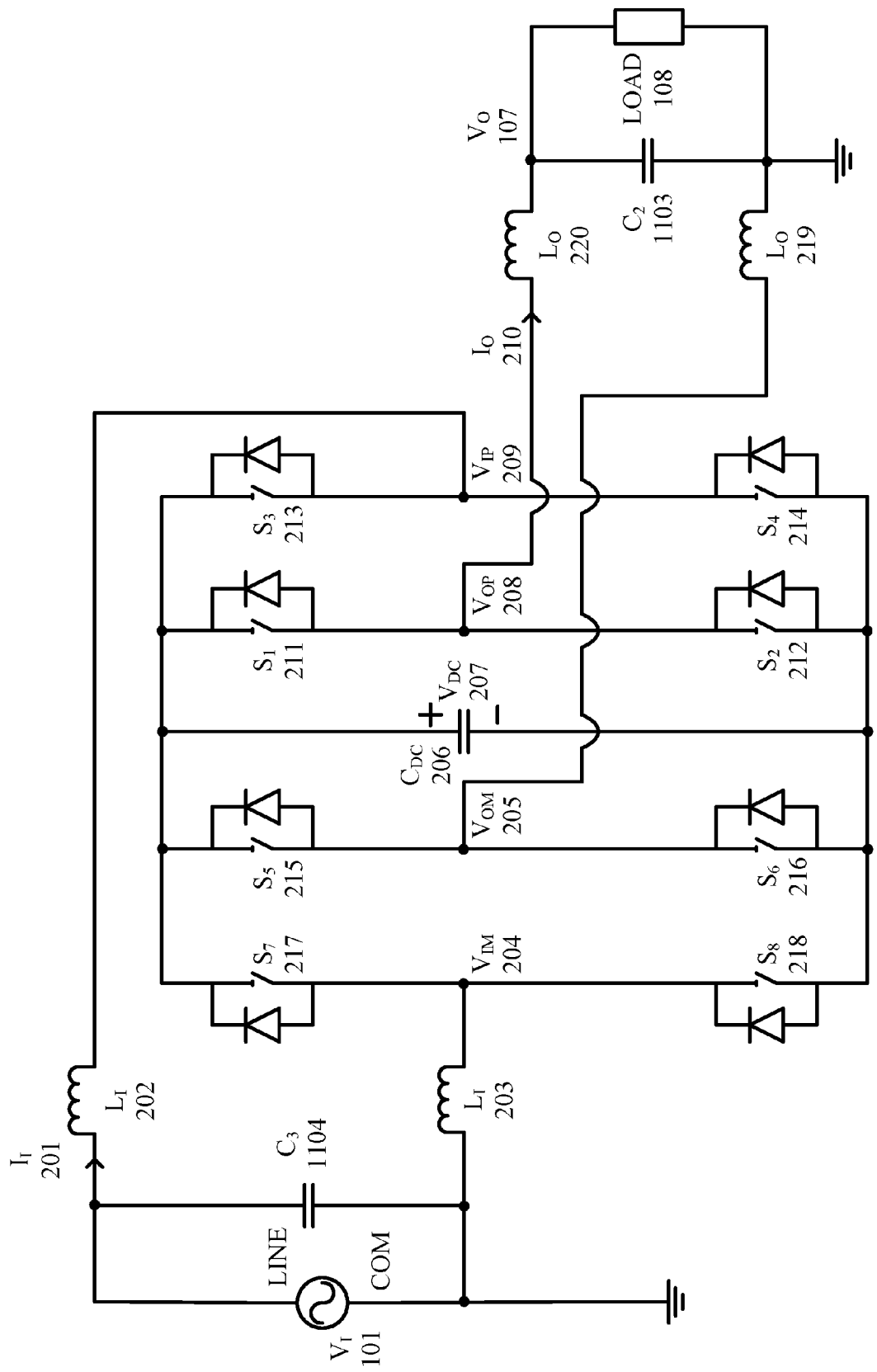
FIG. 2 illustrates a schematic diagram of the system according to a first embodiment of the present inventions.

FIG. 2 illustrates a schematic diagram of the system according to a first embodiment of the present inventions. The AC source 101 ($V_I$) provides line LINE and common COM outputs as illustrated in FIG. 2. In FIG. 2 power from AC Source $V_I$ 101 is transferred to Load 108 according to embodiments of the present inventions. The top side [+] of AC Source $V_I$ 101 is connected to common and the bottom side [−] is connected to Input Inductor $L_I$ 202 where current $I_I$ 201 is flowing from $V_I$ 101 to $L_I$ 202. Input filter capacitor $C_3$ 1104 is connected in parallel with AC Source $V_I$. Inductor $L_I$ 202 connects AC Source $V_I$ 101 to Voltage $V_{IP}$ 209 which is connected to switches $S_3$ 213 and $S_4$ 214. Another Input inductor $L_I$ 203 connects the bottom side AC Source $V_I$ 101 to Voltage $V_{IM}$ 204 which is connected to switches $S_7$ 217 and $S_8$ 218. The eight switches are mutually connected to each other such that the switching nodes get connected to the positive or negative terminal of the $V_{DC}$ capacitor voltage. The first switching node includes switches $S_3$ 213 & $S_4$ 214, the second switching node includes switches $S_1$ 211 & $S_2$ 212, the third switching node includes switches $S_5$ 215 & $S_6$ 216, and the fourth switching node includes switches $S_7$ 217 & $S_8$ 218. Capacitor $C_{DC}$ 206 holds the voltage $V_{DC}$ 207 and is connected to the four switching nodes. The Capacitor $C_{DC}$ 206 servers as a DC power holding source that, in addition to the capacitor, in alternative embodiments, may be paralleled a super capacitor, battery and power converter if desired. Output Inductor $L_O$ 219 is connected to switches $S_5$ 215 and $S_6$ 216 which produce Voltage $V_{OM}$ 205. And the other side of the output inductor $L_O$ 219 is connected to the bottom side of the output LOAD 108. Another output inductor $L_O$ 220 is connected to switches $S_1$ 211 and $S_2$ 212 which produce Voltage $V_{OP}$ 208. And other side Output Inductor $L_O$ 220 is also connected to the positive side of the output LOAD 108. Current $I_O$ 210 flows into Output Inductor $L_O$ 220. Capacitor $C_2$ 1103 with output voltage $V_O$ 107 is connected to the output inductors $L_O$ 219 and $L_O$ 220 and feeds the LOAD 108. The common is connected to the return paths of both the load 108 and the source $V_I$ 101.

An input low pass filter 202, 203, 1104 is operatively coupled to an input terminal from the AC power source 101 and having filter characteristics to eliminate switching frequency energy from entering the AC power source. An input half-bridge switch 213, 214 is operatively coupled to the DC power holding source and operating at a common switching frequency. A common half-bridge switch 217, 218 is operatively coupled to the DC power holding source 206 and operates at the common switching frequency. An output half-bridge switch 211, 212 is operatively coupled to the DC power holding source 206 and operates at the common switching frequency. In alternative constructions, the common half-bridge switch 217, 218 can also have another common half-bridge switch 215, 216 operatively coupled to form a common full-bridge switch.

A controller 102 is operatively coupled to at least two of the input half-bridge switch 213, 214, the common full-bridge switch 215-218, and the an output half-bridge switch 211, 212 to generate at least two control signals at the common switching frequency, wherein the controller generates at least two control signals with a phase difference there between chosen to cause a ripple frequency in both the input low pass filter and the output low pass filter to be double the common switching frequency.

An output low pass filter 219, 220, 1103 is operatively coupled to the output half-bridge switch 211, 212 and has filter characteristics to eliminate the common switching frequency energy from entering the AC load 108. An output terminal is operatively coupled from the output low pass filter to the AC load 108.

In the first embodiment of FIG. 2 the controller 102 generates three control signals comprising an input half-bridge switch control signal operatively coupled to switch the input half-bridge switch 213, 214, a common half-bridge switch control signal operatively coupled to switch the common half-bridge switches 215-218, and an output half-bridge switch control signal operatively coupled to switch the output half-bridge switch 211, 212. The controller 102 generates the input half-bridge switch control signal and the common half-bridge switch control signal with a phase difference there between chosen to cause a ripple frequency in both the input low pass filter and the output low pass filter to be double the common switching frequency. The controller 102 generates the common half-bridge switch control signal and the output half-bridge switch control signal with a phase difference there between chosen to cause a ripple frequency in both the input low pass filter 202, 203, 1104 and the output low pass filter 219, 220, 1103 to be double the common switching frequency.

It is desired that the common switching frequency is chosen low enough to achieve the highest efficiency. When the switching frequency of the common half-bridge switch 215-216 is the same as the switching frequency of the output half-bridge switch 211, 212 but out of phase, its fundamental frequency is cancelled and only harmonics of the fundamental switching frequency are present particularly in inductor currents of the system. Also, when the switching frequency of the common half-bridge switch 217-218 is the same as the switching frequency of the input half-bridge switch 213, 214 but out of phase, the fundamental switching frequency is cancelled and only harmonics of the fundamental switching frequency are present particularly in the inductor currents of the system. Audible noise is thus cancelled. For example, when the half-bridge switches are operated at 10 kHZ, the inductor currents are inaudible harmonics at 20 kHZ and above.

Figure 3:
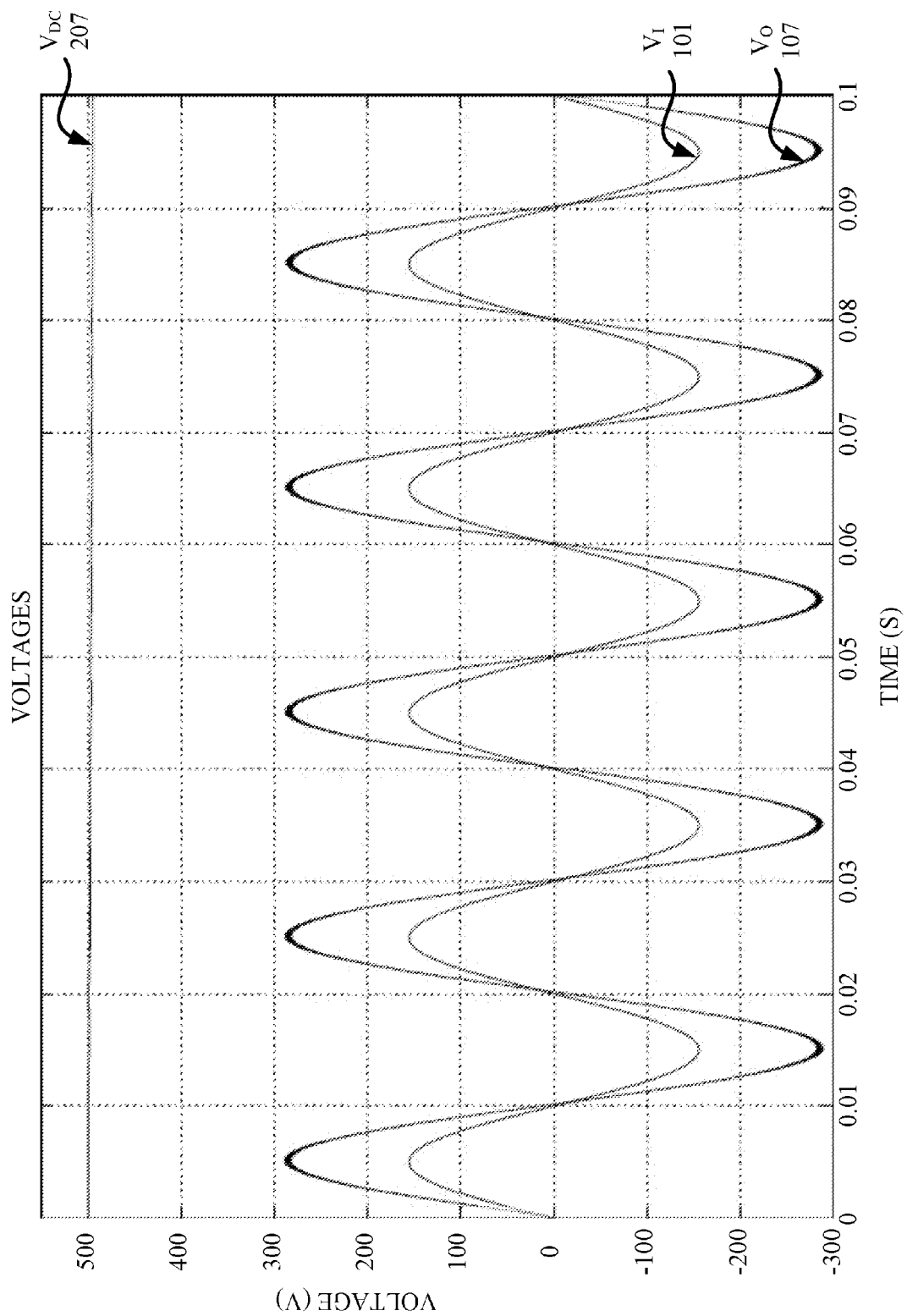
FIG. 3 illustrates Plot's over time of Voltages of the circuit of FIG. 2 according to embodiments of the present inventions.

FIG. 3 illustrates a plot over time of Voltages of the circuit of FIG. 2. The top waveform is the capacitor voltage $V_{DC}$ 207. In this case the system uses 600V switches and the control sets the capacitor voltage at about 500V to maintain sufficient margin from the maximum allowable voltage while having significant energy storage for supporting the load in the event that the input voltage source $V_I$ collapses. The lower two sinusoidal waveforms are input voltage $V_I$ 101 and output voltage $V_O$ 107. In this case the input voltage is much lower and the system works to provide approximately 220V rms.

Figure 4:
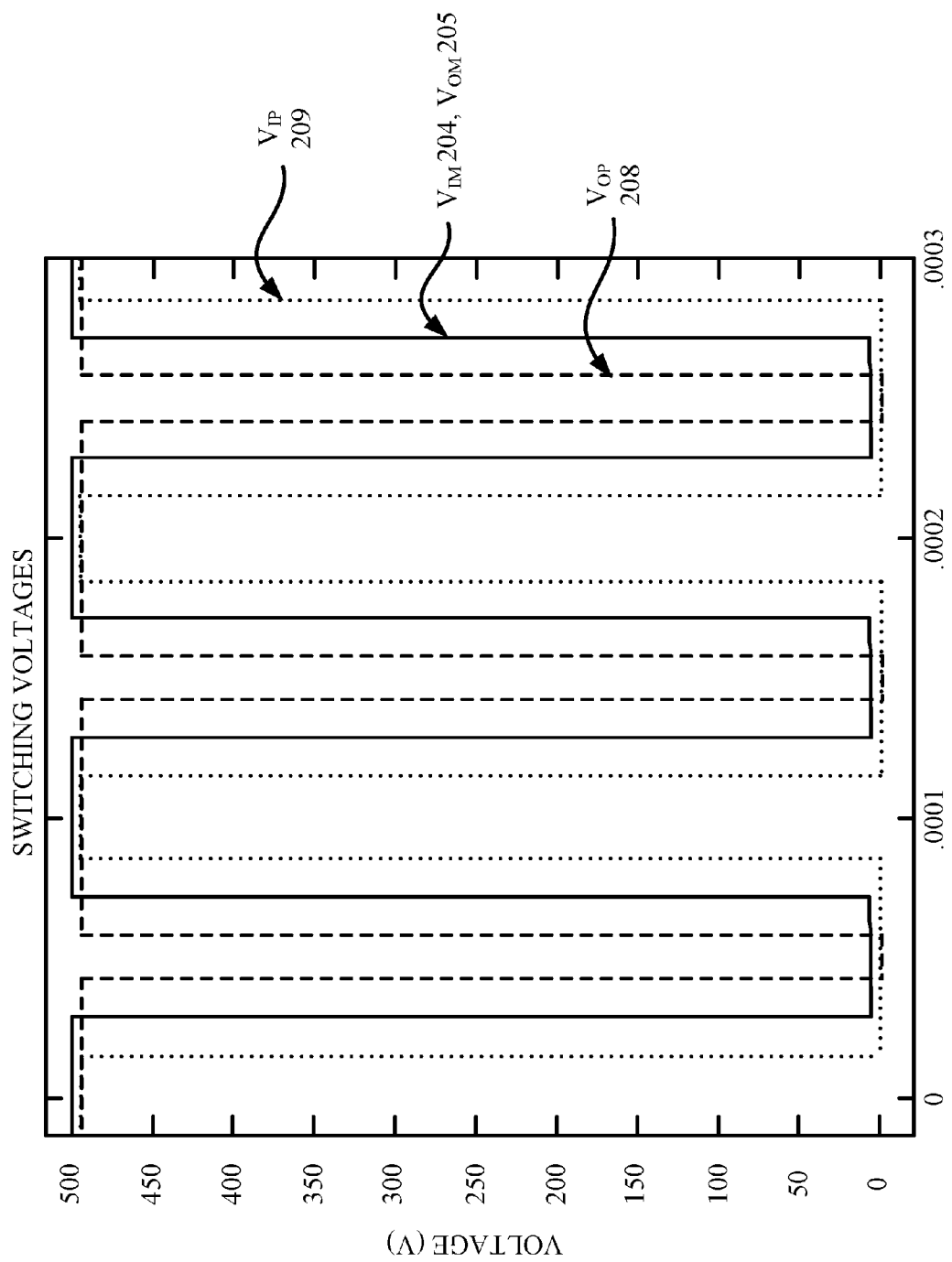
FIG. 4 illustrates a Timing Waveform over time of Voltages of the circuit of FIG. 2 according to embodiments of the present inventions.

FIG. 4 illustrates a plot over time of the switching voltages of the circuit of FIG. 2. In this case the system control sets the capacitor voltage to about 500V. There are four switching waveforms input positive switching voltage $V_{IP}$ 209, output positive switching voltage $V_{OP}$ 208 and the negative switching voltages $V_{IM}$ 204 and $V_{OM}$ 205. In an embodiment the switching voltages are at the same switching frequency chosen here to be 10 kHz. The ripple in the current due to differential nature of the system is at twice the switching frequency or 20 kHz which is inaudible. The lower switching frequency results in higher efficiency which is desirable.

The duty ratio of the negative switching voltages $V_{IM}$ 204 and $V_{OM}$ 205 can vary from each other for short intervals during some transients but in steady state they are equal to each other. This is because of the common connection to both the source and load voltages. The duty ratios on the input side of the bridge are chosen to set the capacitor voltage $V_{DC}$ to a nominal high voltage like 500V. The duty ratios on the output side of the bridge are chosen to set the load voltage $V_O$ to a nominal output voltage like 220V rms. The average of the duty ratios on the positive side of the bridge indirectly set the duty ratios on the negative side of the bridge. The switches on the input side of the bridge are connecting two low impedance nodes namely $V_I$ 101 and $V_{DC}$ 207. Connecting two low impedance sources requires accurate control of the duty ratios. The duty ratio can be chosen to be the ratio of the two voltages. By adjusting the amplitude and phase of the voltage signals we can set the currents to be in phase with the voltage maximizing efficiency and providing unity power factor.

Figure 5:
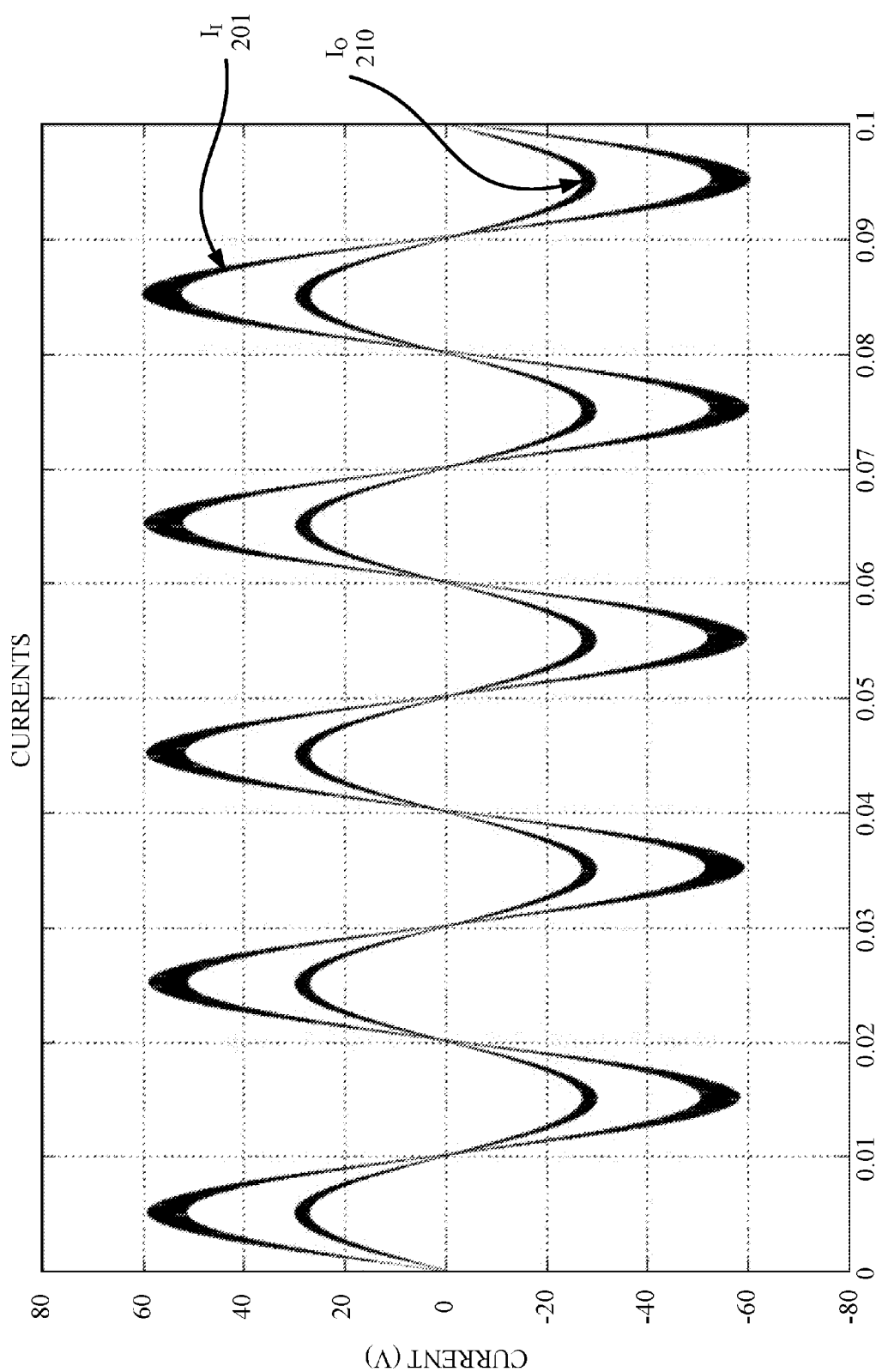
FIG. 5 illustrates Plot's over time of Currents of the circuit of FIG. 2 according to embodiments of the present inventions.

FIG. 5 illustrates a plot over time of currents $I_I$ 201 and $I_O$ 210. The duty ratios are chosen such that both currents are in phase with the respective voltages and maximizing efficiency and providing unity power factor.

Figure 6:
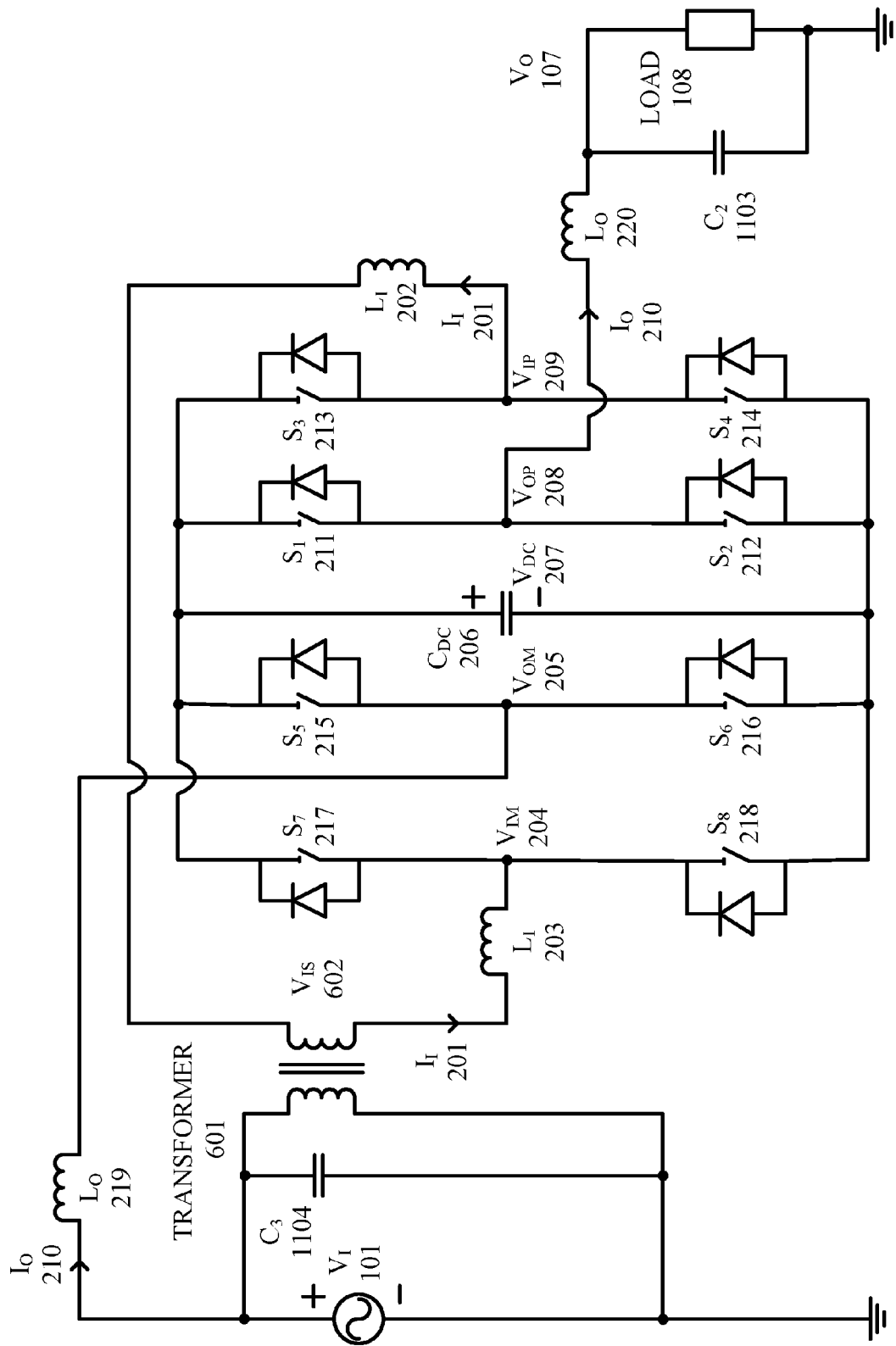
FIG. 6 illustrates a schematic diagram of the system that includes a transformer according to a second embodiment of the present inventions.

FIG. 6 illustrates a schematic diagram of the system that includes a transformer according to a second embodiment of the present inventions. Power from AC Source $V_I$ 101 is transferred to Load 108 according to embodiments of the present inventions that include a transformer. The AC Source $V_I$ 101 is connected to common at the negative side and the positive side is connected to the output in series with an output bridge. The positive side of AC Source $V_I$ 101 is connected to output Inductor $L_O$ 219. The load current $I_O$ 210 flows through inductor $L_O$ 219 and through inductor $L_O$ 220 and is connected to Voltage node $V_O$ 107. Input Inductor $L_I$ 202 is connected to top of the Transformer 601 and the other side of it is connected to Voltage $V_{IP}$ 209 which is connected between two switches $S_3$ 213 and $S_4$ 214. The current $I_I$ 201 flows through $L_I$ 202 and through $L_I$ 203. Input inductor $L_I$ 203 is connected to bottom of the Transformer 601 & other side it is connected to Voltage node $V_{IM}$ 204 which is connected to switches $S_7$ 217 and $S_8$ 218. The eight Switches are mutually connected such that they form four half-bridges or two full bridges across the capacitor $C_{DC}$ 206 which holds the voltage $V_{DC}$ 207. One half-bridge includes switches $S_3$ 213 & $S_4$ 214, a second half-bridge includes switches $S_1$ 211 & $S_2$ 212, a third half-bridge include switches $S_5$ 215 & $S_6$ 216, a fourth half-bridge include switches $S_7$ 217 & $S_8$ 218. Output inductor $L_O$ 220 is connected with Voltage $V_{OP}$ 208 which is connected to switches $S_1$ 211 and $S_2$ 212. The primary side of Transformer 601 is connected across the AC Source $V_I$ 101 and the secondary side has voltage $V_{IS}$ 602 and is connected to Input inductor $L_I$ 202 and Input inductor $L_I$ 203.

An input low pass filter 202, 203 and 1104 (reflected through 601) is operatively coupled to an input terminal from the AC power source 101 and having filter characteristics to eliminate switching frequency energy from entering the AC power source 101. A DC power holding source 206 is operatively coupled to the input low pass filter 202, 203, 1104. An input full-bridge switch 213, 214, 217, 218 is operatively coupled to the DC power holding source and operating at a common switching frequency. An output full-bridge switch 211, 212, 215, 216 is operatively coupled to the DC power holding source 106 and operates at the common switching frequency.

A transformer 601 is operatively coupled between the AC power source 101 and the input low pass filter 202, 203, 1104 and the output low pass filter 219, 220, 1103 is operatively coupled in series with the AC power source 101 and the output full-bridge switch 211, 212, 215, 216. By using the transformer 601, the voltage ratings of the switches can be reduced compared to other embodiments without the transformer. In the second embodiment of FIG. 6, the voltage ratings of the input full-bridge switch 213, 214, 217, 218 and the output full-bridge switch 211, 212, 215, 216 are chosen sufficient to handle a voltage of the AC power source 101 divided by a turns ratio reduction of the transformer 601.

A controller 102 is operatively coupled to at least two of the input half-bridge switch 213, 214, the common half-bridge switches 215-218, and the an output half-bridge switch 211, 212 to generate at least two control signals at the common switching frequency, wherein the controller generates the at least two control signals with a phase difference therebetween chosen to cause a ripple frequency in both the input low pass filter and the output low pass filter to be double the common switching frequency.

An output low pass filter 219, 220, 1103 is operatively coupled to the output full-bridge switch 211, 212, 215, 216 and has filter characteristics to eliminate the common switching frequency energy from entering the AC load 108. An output terminal is operatively coupled from the output low pass filter to the AC load 108.

In the second embodiment with the transformer 601 of FIG. 6, the controller 102 generates three control signals comprising an input half-bridge switch control signal operatively coupled to switch the input half-bridge switch 213, 214, a common half-bridge switch control signal operatively coupled to switch the common half-bridge switches 215-218, and an output half-bridge switch control signal operatively coupled to switch the output half-bridge switch 211, 212. The controller 102 generates the input half-bridge switch control signal and the common half-bridge switch control signal with a phase difference there between chosen to cause a ripple frequency in both the input low pass filter and the output low pass filter to be double the common switching frequency. The controller 102 generates the common half-bridge switch control signal and the output half-bridge switch control signal with a phase difference there between chosen to cause a ripple frequency in both the input low pass filter 202, 203, 1104 and the output low pass filter 219, 220, 1103 to be double the common switching frequency.

Figure 7:
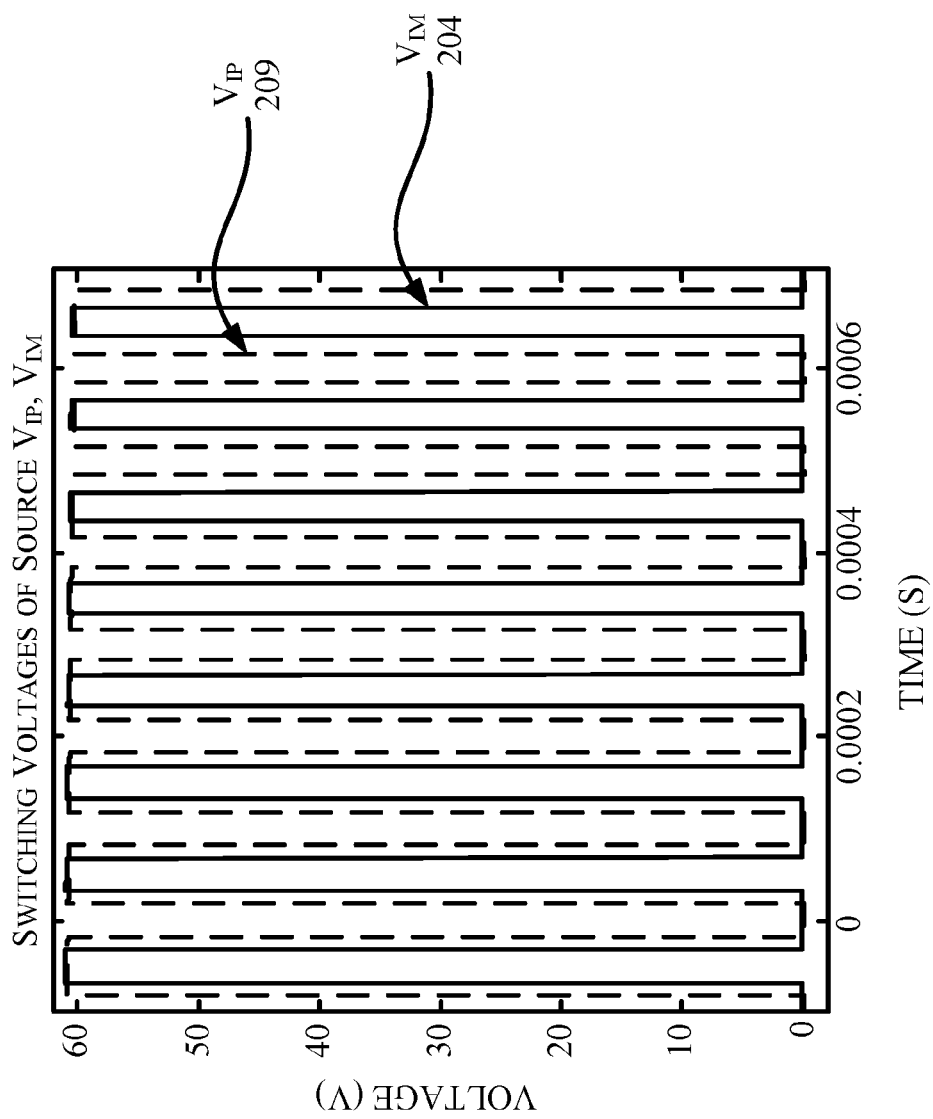
FIG. 7 illustrates a Timing Waveform over time of Switching Voltages of Source $V_{IP}$, $V_{IM}$ according to embodiments of the present inventions that include a transformer.

FIG. 7 illustrates a Timing Waveform over time of Switching Voltages on the input side $V_{IP}$, $V_{IM}$ which switch the voltage $V_{DC}$ 207 stored in the capacitor $C_{DC}$ 206. This voltage is reduced from the AC Source $V_I$ 101 by the turn's ratio of the transformer. These are implemented in an embodiment using 100V tolerant switches and are switching 60V which is the voltage stored in the capacitor $C_{DC}$ 206. The switching frequency is chosen in this embodiment to be 10 kHz. The switching waveforms have the phase relationship such that the current ripple is at twice the switching frequency and at 20 kHz and thus inaudible. The lower switching frequency and lower voltage switches results in higher efficiency which is desirable.

Figure 8:
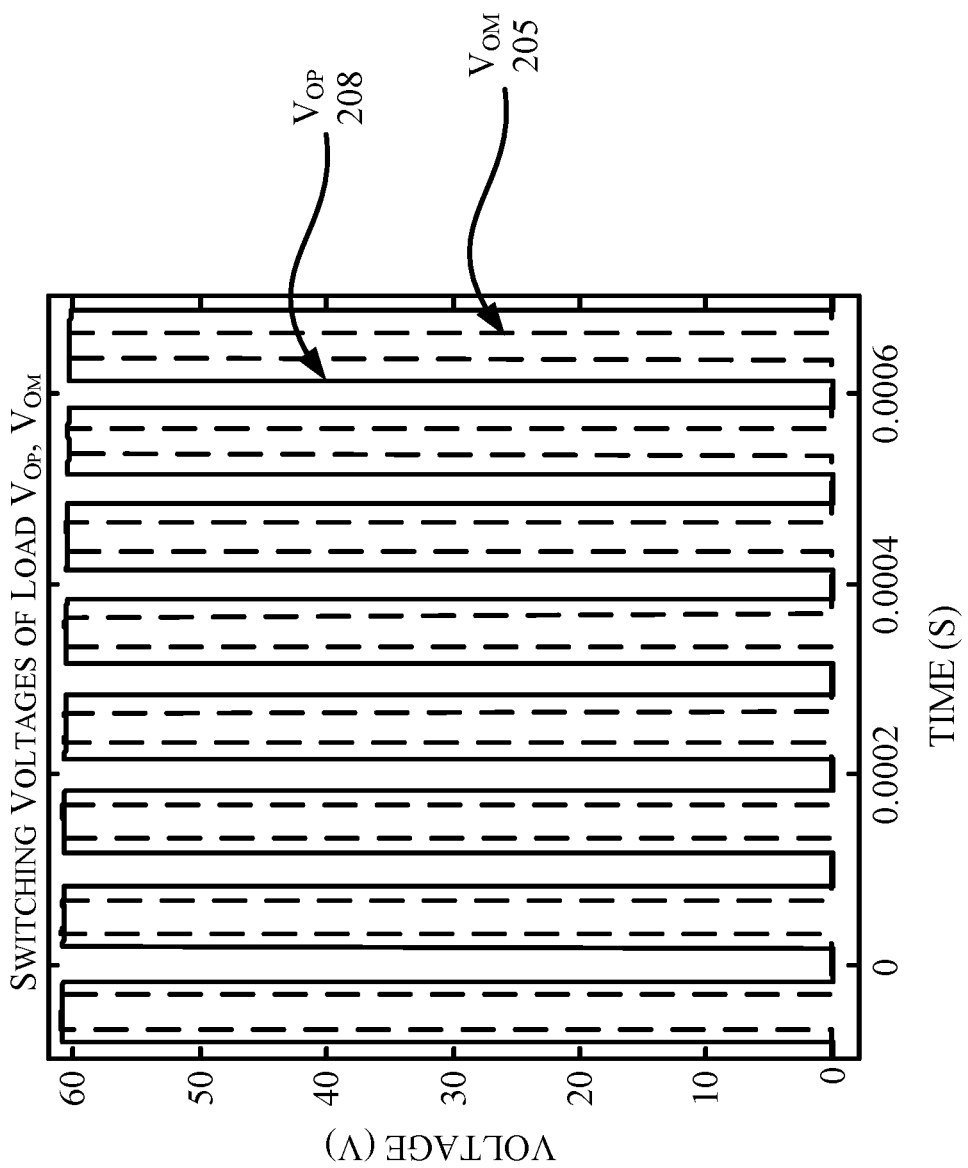
FIG. 8 illustrates a Timing Waveform over time of Switching Voltages of Load $V_{OP}$, $V_{OM}$ according to embodiments of the present inventions that include a transformer.

FIG. 8 illustrates a Timing Waveform over time of Switching Voltages of Load $V_{OP}$, $V_{OM}$ which switch the voltage $V_{DC}$ 207 stored in the capacitor $C_{DC}$ 206. This voltage is reduced from the AC Source $V_I$ 101 by the turn's ratio of the transformer. These are implemented in an embodiment using 100V tolerant switches and are switching 60V which is the voltage stored in the capacitor $C_{DC}$ 206. The switching frequency is chosen in this embodiment to be 10 kHz. The switching waveforms have the phase relationship such that the current ripple is at twice the switching frequency and at 20 kHz and thus inaudible. The lower switching frequency and lower voltage switches results in higher efficiency which is desirable.

Figure 9:
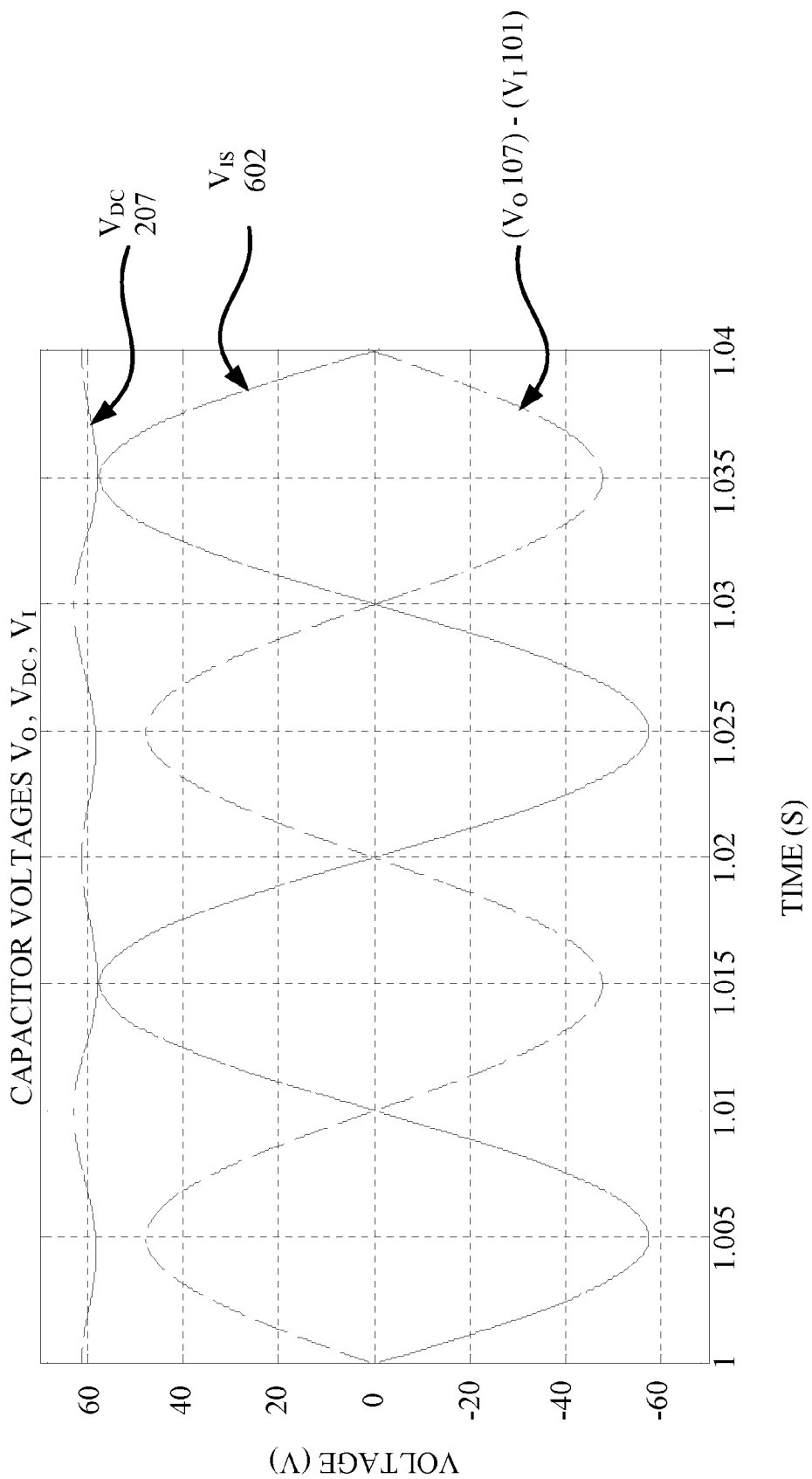
FIG. 9 illustrates Plot's over time of Capacitor Voltages $V_O$, $V_{DC}$, $V_I$ according to embodiments of the present inventions that include a transformer.

FIG. 9 illustrates Plot's over time of Capacitor Voltages $V_{IS}$, $V_{DC}$, $V_O$-$V_I$. The top waveform is the $V_{DC}$ 207 stored in the capacitor $C_{DC}$ 206. The lower two waveforms are sinusoidal and plot transformer secondary $V_{IS}$ 602, and the correction voltage ($V_O$ 107)-($V_I$ 101). In this case the AC Source $V_I$ 101 is too high in amplitude and the correction reduces this voltage to the desired output voltage for example 220V rms.

Figure 10:
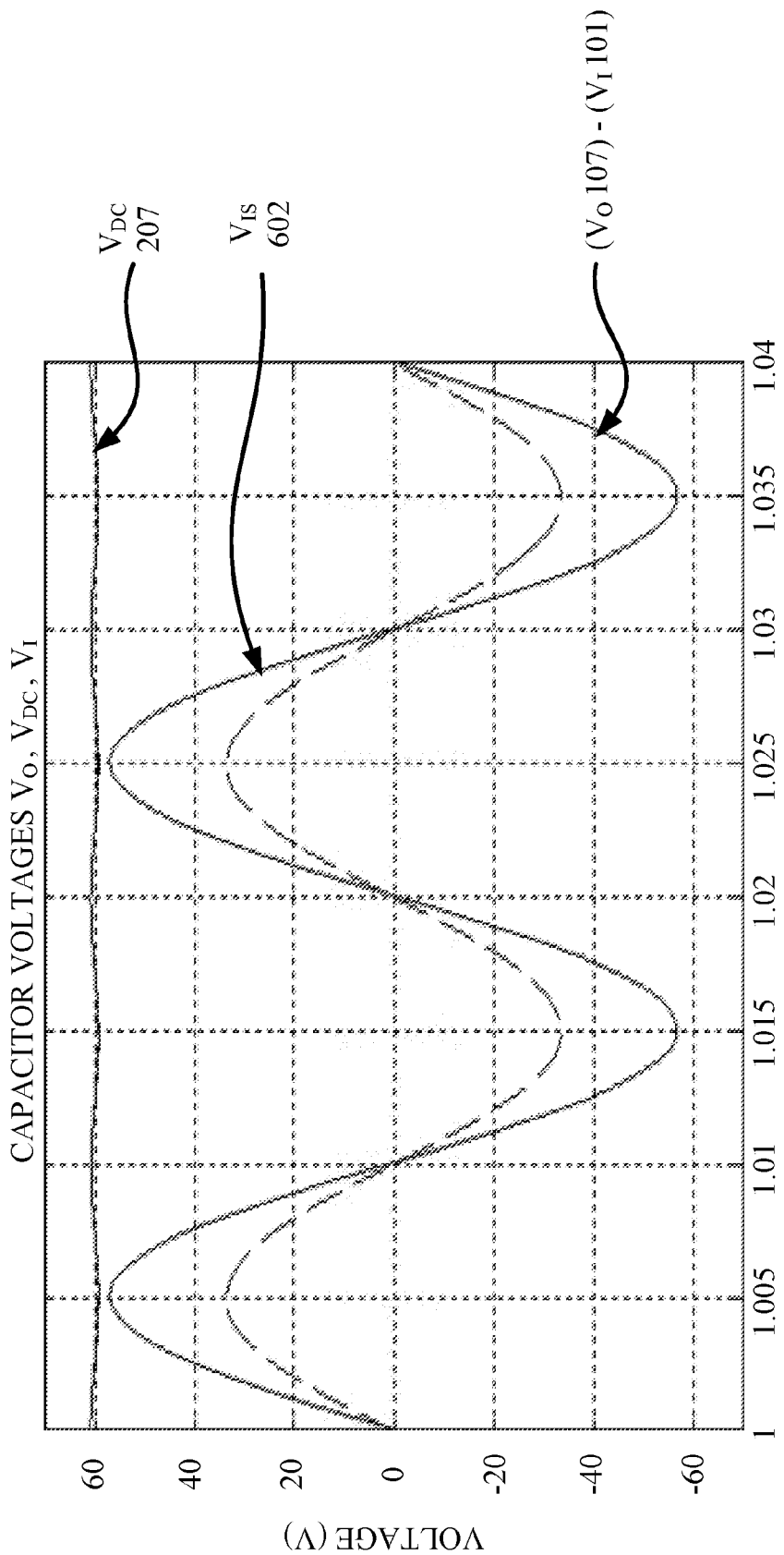
FIG. 10 illustrates Plot's over time of Capacitor Voltages $V_O$, $V_{DC}$, $V_I$ according to embodiments of the present inventions that include a transformer.

FIG. 10 illustrates Plot's over time of Capacitor Voltages $V_{IS}$, $V_{DC}$, $V_O$-$V_I$. The top waveform is the $V_{DC}$ 207 stored in the capacitor $C_{DC}$ 206. The lower two waveforms are sinusoidal and plot transformer secondary $V_{IS}$ 602, and the correction voltage ($V_O$ 107)-($V_I$ 101). In this case the AC Source $V_I$ 101 is too low in amplitude and the correction increases this voltage to the desired output voltage for example 220V rms.

Figure 11:
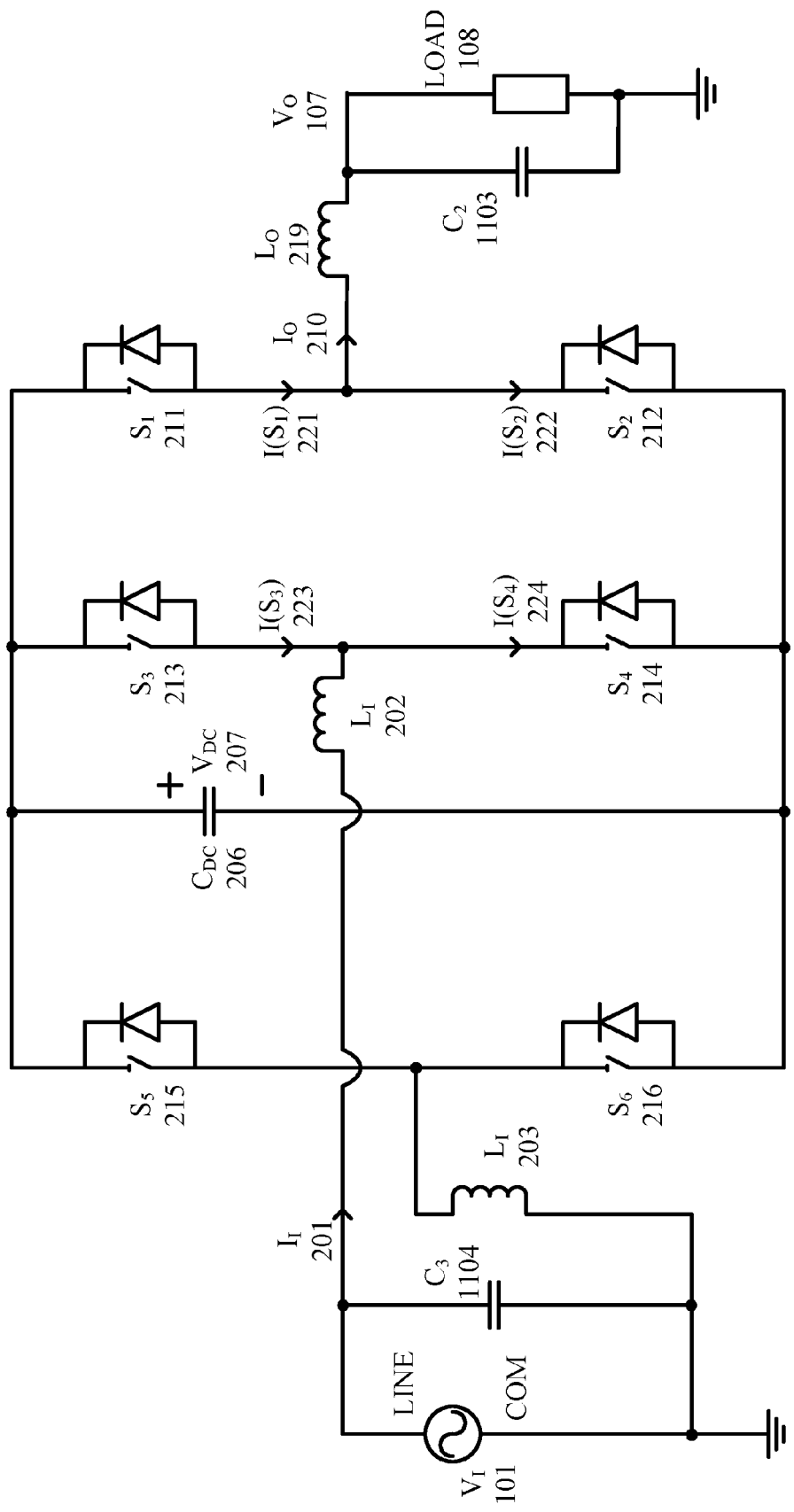
FIG. 11 illustrates a schematic diagram of the system according to a third embodiment of the present inventions.

FIG. 11 illustrates a schematic diagram of the system according to a third embodiment of the present inventions. The AC source 101 ($V_I$) provides line LINE and common COM outputs as illustrated in FIG. 11. The system of FIG. 11 is capable of forward and reverse power flow where AC Source $V_I$ 101 and an active rectifier 1101 are connected with switches to $V_{DC}$ according to the third embodiment. The common side of the AC Source $V_I$ 101 is connected to common and the other side is connected to Switches $S_3$ 213 and $S_4$ 214. The current $I_I$ 201 flows out of the AC Source $V_I$ 101. Six switches are connected to form three half-bridges. First half-bridge includes switches $S_1$ 211 & $S_2$ 212, second half-bridge includes Switches $S_3$ 213 and $S_4$ 214, third half-bridge includes $S_5$ 215 and $S_6$ 216. Capacitor $C_{DC}$ 206 holds the voltage $V_{DC}$ 207 and is connected to all three half-bridges. Input inductor $L_I$ 203 is connected to common and the third half-bridge comprising the switches $S_5$ 215 and $S_6$ 216. Input inductor $L_I$ 202 is connected to positive of AC Source $V_I$ 101 and the second half-bridge comprising the switches $S_3$ 213 and $S_4$ 214. Output Inductor is connected between first half-bridge comprised of switches $S_1$ 211 and $S_2$ 212 and output voltage node $V_O$ 107. The output inductor $L_O$ 219 carries current $I_O$ 210. Capacitor $C_3$ 1104 is connected in parallel with AC Source $V_I$ 101. Capacitor $C_2$ 1103 is connected between common and Output Inductor $L_O$ 219. Active rectifier 1101 is the third half-bridge comprising the switches $S_5$ 215 and $S_6$ 216. Current though switch $S_1$ is $I(S_1)$ 221, current though switch $S_2$ is $I(S_2)$ 222, current though switch $S_3$ is $I(S_3)$ 223 and current though switch $S_4$ is $I(S_4)$ 224. The current directions are chosen to be flowing in the direction opposite of the anti-parallel diode built into the switch.

An input low pass filter 202, 203, 1104 is operatively coupled to an input terminal from the AC power source 101 and the common half-bridge switch 215-216 and has filter characteristics sufficient to eliminate energy at the common switching frequency from entering the AC power source 101.

A DC power holding source 206 is operatively coupled to the input low pass filter 202, 203, 1104. An input half-bridge switch 213, 214 is operatively coupled to the DC power holding source 206 and operating at a common switching frequency. A common half-bridge switch 215-216 is operatively coupled to the DC power holding source 206 and operates at the common switching frequency. An output half-bridge switch 211, 212 is operatively coupled to the DC power holding source 206 and operates at the common switching frequency.

A controller 102 is operatively coupled to the input half-bridge switch 213, 214, the common half-bridge switch 215-216, and the an output half-bridge switch 211, 212 to generate three control signals at the common switching frequency.

An output low pass filter 219, 1103 is operatively coupled to the output half-bridge switch 211, 212 and has filter characteristics to eliminate the common switching frequency energy from entering the AC load 108. An output terminal 110 is operatively coupled from the output low pass filter to the AC load 108.

In the third embodiment of FIG. 11 the controller 102 generates three control signals comprising an input half-bridge switch control signal operatively coupled to switch the input half-bridge switch 213, 214, a common half-bridge switch control signal operatively coupled to switch the common half-bridge switch 215-216, and an output half-bridge switch control signal operatively coupled to switch the output half-bridge switch 211, 212. The controller 102 generates the input half-bridge switch control signal and the common half-bridge switch control signal with a phase difference there between chosen to cause a ripple frequency in both the input low pass filter and the output low pass filter to be double the common switching frequency. The controller 102 generates the common half-bridge switch control signal and the output half-bridge switch control signal with a phase difference there between chosen to cause a ripple frequency in both the input low pass filter 1104 and the output low pass filter 1103 to be double the common switching frequency.

Figure 12:
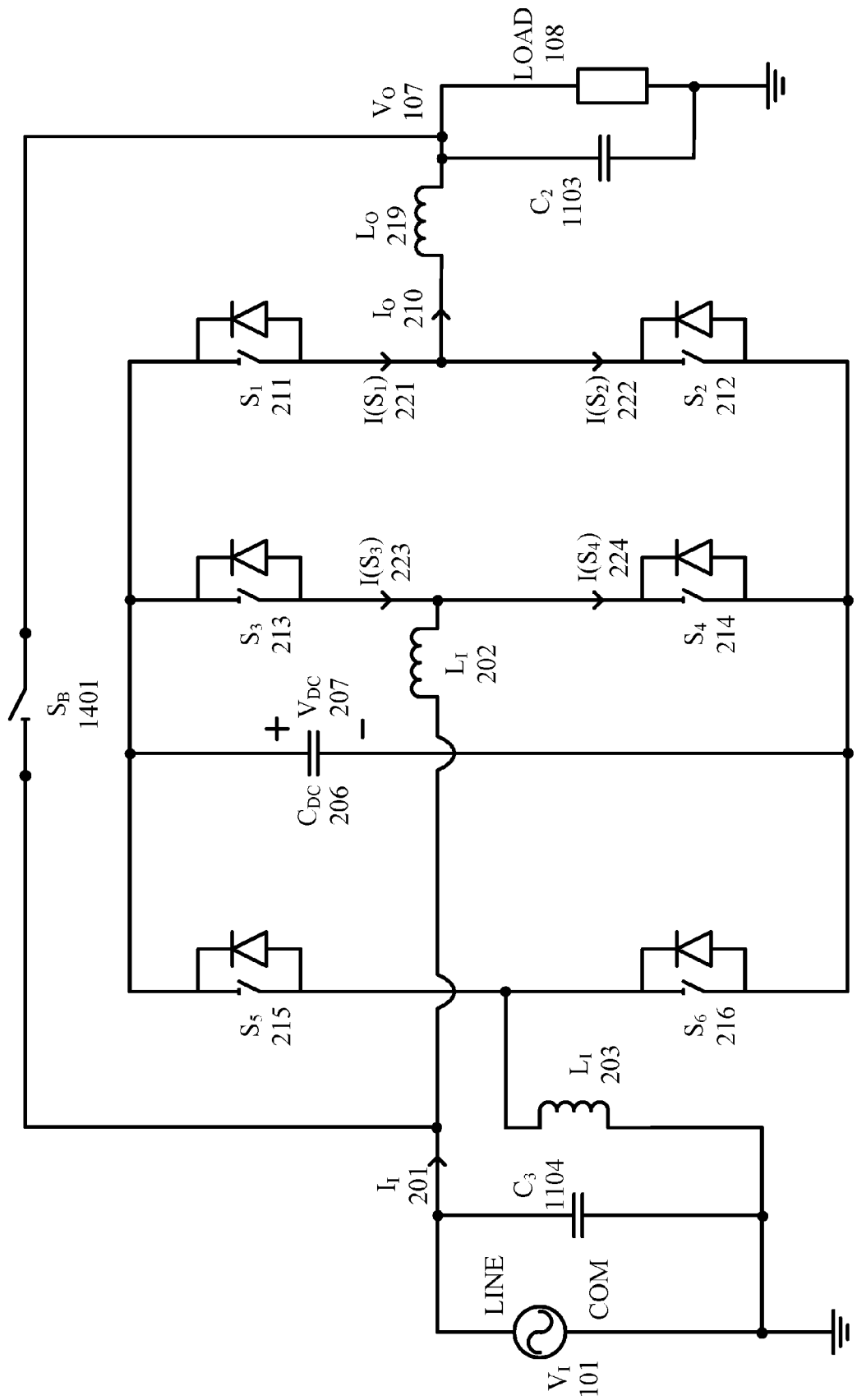
FIG. 12 illustrates a schematic diagram of the system according to a fourth embodiment of the present inventions.

FIG. 12 illustrates a schematic diagram of the system according to a fourth embodiment of the present inventions. The AC source 101 ($V_I$) provides line LINE and common COM outputs as illustrated in FIG. 12. FIG. 12 illustrates a voltage regulator with static bypass switch for standby operation where AC Source $V_I$ 101 is connected with $S_B$ 1401 to output $V_O$ 107 according to the fourth embodiment. When the AC Source $V_I$ 101 is nominally close to the desired output voltage the bypass switch $S_B$ 1401 is turned on and the remaining switches can all be turned off.

An input low pass filter 202, 203, 1104 is operatively coupled to an input terminal from the AC power source 101 and having filter characteristics to eliminate switching frequency energy from entering the AC power source 101. A DC power holding source 106 is operatively coupled to the input low pass filter 202, 203, 1104. An input half-bridge switch 213, 214 is operatively coupled to the DC power holding source 101 and operating at a common switching frequency. A common half-bridge switch 215, 216 is operatively coupled to a DC power holding source 1102 and operates at the common switching frequency. An output half-bridge switch 211, 212 is operatively coupled to the DC power holding source 1102 and operates at the common switching frequency.

A controller 102 is operatively coupled to the input half-bridge switch 213, 214, the common half-bridge switch 215, 216, and the an output half-bridge switch 211, 212 to generate three control signals at the common switching frequency.

An output low pass filter 219, 1103 is operatively coupled to the output half-bridge switch 211, 212 and has filter characteristics to eliminate the common switching frequency energy from entering the AC load 108. An output terminal is operatively coupled from the output low pass filter to the AC load 108.

Figure 13:
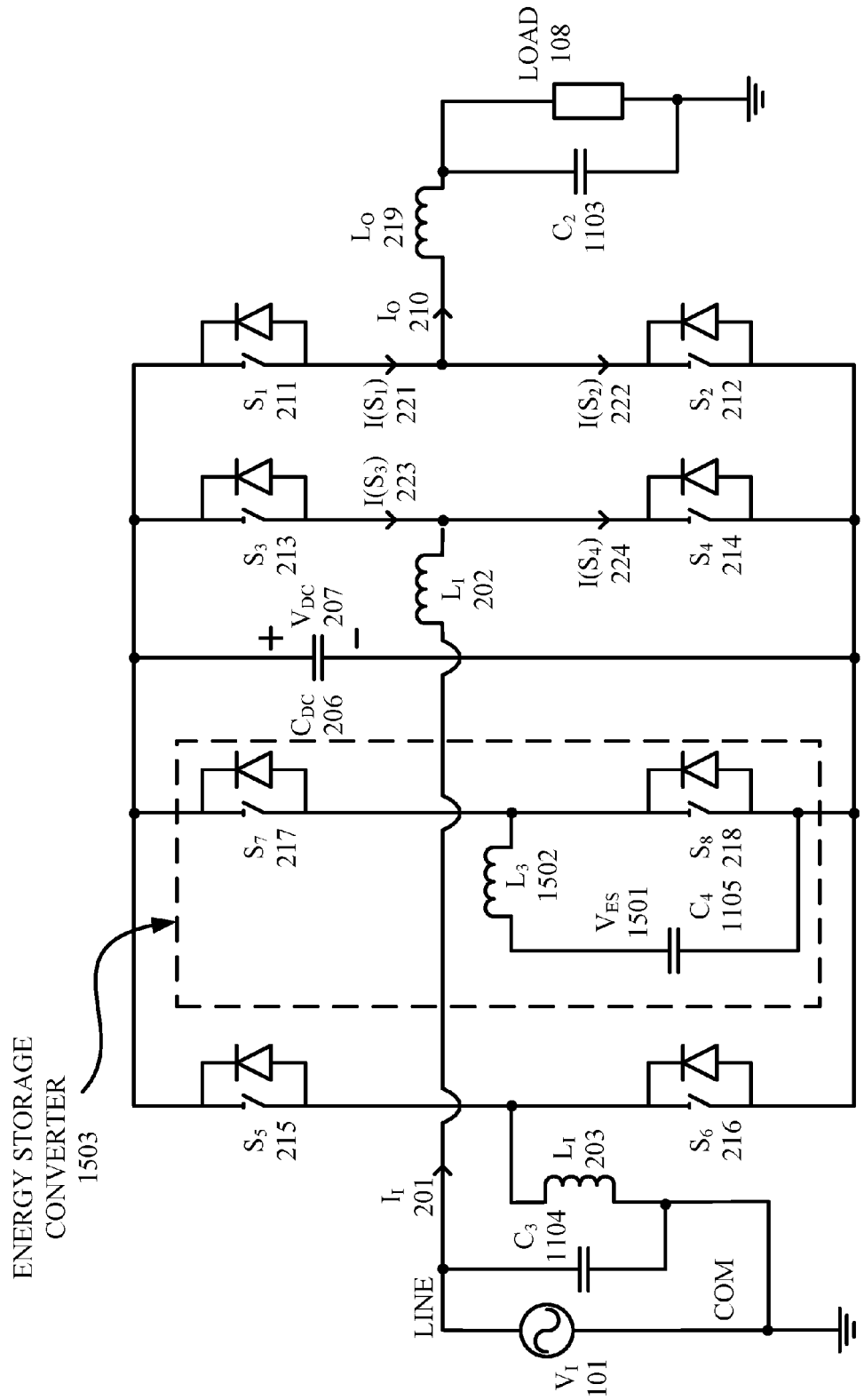
FIG. 13 illustrates a schematic diagram of the system according to a fifth embodiment of the present inventions.

FIG. 13 illustrates an energy storage converter option according to a fifth embodiment. The AC source 101 ($V_I$) provides line LINE and common COM outputs as illustrated in FIG. 13. An additional two semiconductor switches $S_7$ 217 & $S_8$ 218 may be added to the circuit to provide DC/DC power conversion from an energy storage device $C_4$ 1105 such as an electrolytic capacitor, double-layer ultra-capacitor or battery. $S_7$ 217 & $S_8$ 218 may be controlled to charge or discharge the energy storage component $C_4$ 1105. Control of $S_7$ 217 & $S_8$ 218 is completely independent of the position of the other switches. The DC storage component $C_4$ 1105 must operate at a lower voltage than the DC bus in this configuration. An alternate DC/DC buck converter may be used if the DC storage component voltage is higher than the DC bus but this would not be preferred.

FIG. 13 illustrates a schematic diagram of the system according to a fifth embodiment of the present inventions. FIG. 13 illustrates a voltage regulator with addition of energy storage converter components $S_7$ 217 & $S_8$ 218 $L_3$ 1502 and $C_4$ 1105. $C_4$ may be an electrolytic capacitor, ultra-capacitor, battery or any other DC storage device where AC Source $V_I$ 101 is connected between switches with $L_3$ 1502 according to the fifth embodiment. FIG. 13 illustrates AC Source $V_I$ 101 is connected to common at the bottom side and the top side is connected to one side of $L_I$ 202. The other side of LI 202 is connected to the node between Switches $S_3$ 213 & $S_4$ 214 where $I_I$ 201 is flowing in the direction of Switches. Eight Switches are mutually connected to each other in horizontal & vertical modes which are then divided in the vertical section. First vertical section includes Switches $S_1$ 211 & $S_2$ 212, second vertical section includes Switches $S_3$ 213 & $S_4$ 214, and third vertical section includes Capacitor $C_{DC}$ 206 with $V_{DC}$ 207 is also connected in vertical modes between the second vertical section and a fourth vertical section. The fourth vertical section includes Switches $S_7$ 217 & $S_8$ 218. A fifth vertical section includes Switches $S_5$ 215 & $S_6$ 216". Input Inductor $L_I$ 202 is connected to common at bottom side and the top side is connected between Switches $S_5$ 215 & $S_6$ 216. Inductor $L_3$ 1502 is connected to Capacitor $C_4$ 1105 with $V_{ES}$ 1501 at bottom side and the top side is connected between Switches $S_7$ 217 & $S_8$ 218 where Capacitor $C_4$ 1105 is connected between Switches $S_6$ 216 & $S_8$ 218 at horizontal mode. Output Inductor $L_O$ 219 is connected between two switches $S_1$ 211 and $S_2$ 212 and the other side is connected to Voltage $V_O$ 107. Capacitor $C_2$ 1103 is connected to Switches $S_3$ 213 and $S_4$ 214 at the bottom side and the top side is connected between Output Inductor $L_O$ 219 & Voltage $V_O$ 107. Current $I(S_1)$ 221 & $I(S_2)$ 222 are flowing in the direction of switch $S_2$ 212 from switch $S_1$ 211. Also Current $I(S_3)$ 223 & $I(S_4)$ 224 are flowing in the direction of switch $S_4$ 214 from switch $S_3$ 213.

An input low pass filter 202 is operatively coupled to an input terminal from the AC power source 101 and having filter characteristics to eliminate switching frequency energy from entering the AC power source. A DC power holding source 1102 is operatively coupled to the input low pass filter 202. An input half-bridge switch 213, 214 is operatively coupled to the DC power holding source and operating at a common switching frequency. A common half-bridge switch 215-218 is operatively coupled to the DC power holding source 1102 and operates at the common switching frequency. An output half-bridge switch 211, 212 is operatively coupled to the DC power holding source 1102 and operates at the common switching frequency. The common half-bridge switch 104, 213, 214 can also have another common half-bridge switch 104, 213, 214 operatively to form a common full-bridge switch. An energy storage converter 1503 is made of a series capacitor 1104 and an inductor 1502 as illustrated.

A controller 102 is operatively coupled to at least two of the input half-bridge switch 213, 214, the common half-bridge switch 215-216, an output half-bridge switch 211, 212 and the energy storage converter half-bridge switch 217, 218 to generate at least two control signals at the common switching frequency, wherein the controller generates the at least two control signals with a phase difference there between chosen to cause a ripple frequency in both the input low pass filter and the output low pass filter to be double the common switching frequency.

An output low pass filter 219, 1103 is operatively coupled to the output half-bridge switch 211, 212 and has filter characteristics to eliminate the common switching frequency energy from entering the AC load at output terminal 107. An output terminal is operatively coupled from the output low pass filter to the AC load 108.

In the fifth embodiment of FIG. 13 the controller 102 generates three control signals comprising an input half-bridge switch control signal operatively coupled to switch the input half-bridge switch 213, 214, a common half-bridge switch control signal operatively coupled to switch the common half-bridge switch 215-216, an output half-bridge switch control signal operatively coupled to switch the output half-bridge switch 211, 212 and the energy storage converter half-bridge switch 217, 218. The controller 102 generates the input half-bridge switch control signal and the common half-bridge switch control signal with a phase difference there between chosen to cause a ripple frequency in both the input low pass filter and the output low pass filter to be double the common switching frequency. The controller 102 generates the common half-bridge switch control signal and the output half-bridge switch control signal with a phase difference there between chosen to cause a ripple frequency in both the input low pass filter 202, 203, 1104 and the output low pass filter 219, 1103 to be double the common switching frequency.

It is desired that the common switching frequency is chosen low enough to achieve the highest efficiency. When the switching frequency of the common half-bridge switch 215-216 is the same as the switching frequency of the output half-bridge switch 211, 212, its fundamental frequency is cancelled and only harmonics of the fundamental switching frequency are present particularly in inductor currents of the system. Also, when the switching frequency of the common half-bridge switch 215-216 is the same as the switching frequency of the input half-bridge switch 213, 214, the fundamental switching frequency is cancelled and only harmonics of the fundamental switching frequency are present particularly in the inductor currents of the system. Audible noise is thus cancelled. For example, when the half-bridge switches are operated at 10 kHZ, the inductor currents are inaudible harmonics at 20 kHZ and above.

The signal processing techniques disclosed herein with reference to the accompanying drawings can be implemented on one or more digital signal processors (DSPs) or other microprocessors. Nevertheless, such techniques could instead be implemented wholly or partially as hardwired circuits. Further, it is appreciated by those of skill in the art that certain well known digital processing techniques are mathematically equivalent to one another and can be represented in different ways depending on choice of implementation.

Any letter designations such as (a) or (b) or (1) or (2) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. An AC power converter for power converting from an AC power source to an AC load, the AC power converter comprising:
    an input terminal from the AC power source;
    an input low pass filter operatively coupled to the input terminal and having filter characteristics to eliminate switching frequency energy from entering the AC power source;
    an input half-bridge switch operatively coupled to the input low pass filter and operating at a common switching frequency;
    a common half-bridge switch operatively coupled to the input low pass filter and operating at the common switching frequency;
    a DC power holding source operatively coupled to the input half-bridge switch and the common half-bridge switch;
    an output half-bridge switch operatively coupled to the DC power holding source and operating at the common switching frequency;
    an output low pass filter operatively coupled to the output half-bridge switch and having filter characteristics to eliminate switching energy of the common switching frequency from entering the AC load;
    a controller operatively coupled to at least two of the input half-bridge switch, the common half-bridge switch, and the output half-bridge switch to generate at least two control signals at the common switching frequency, wherein the controller generates the at least two control signals with a phase difference there between chosen to cause a ripple frequency in both the input low pass filter and the output low pass filter to be double the common switching frequency; and
    an output terminal operatively coupled from the output low pass filter to the AC load.

2. The AC power converter according to claim 1, wherein the controller is operatively coupled to the common half-bridge switch.

3. The AC power converter according to claim 2, wherein the common half-bridge switch further comprises another common half-bridge switch operatively to form a common full-bridge switch.

4. The AC power converter according to claim 1, wherein the controller generates at least three control signals comprising an input half-bridge switch control signal operatively coupled to switch the input half-bridge switch, a common half-bridge switch control signal operatively coupled to switch the common half-bridge switch, and an output half-bridge switch control signal operatively coupled to switch the output half-bridge switch.

5. The AC power converter according to claim 4, wherein the controller generates the input half-bridge switch control signal and the common half-bridge switch control signal with a phase difference there between chosen to cause a ripple frequency in both the input low pass filter and the output low pass filter to be double the common switching frequency; and wherein the controller generates the common half-bridge switch control signal and the output half-bridge switch control signal with a phase difference there between chosen to cause a ripple frequency in both the input low pass filter and the output low pass filter to be double the common switching frequency.

6. The AC power converter according to claim 4, wherein the common half-bridge switch further comprises another common half-bridge switch operatively coupled to form a common full-bridge switch.

7. The AC power converter according to claim 2, wherein the AC power converter further comprises:
    a transformer operatively coupled between the AC power source and the input loss pass filter; and
    wherein the output low pass filter is operatively coupled in series with the AC power source and the output half-bridge switch.

8. The AC power converter according to claim 7, wherein voltage ratings of the input half-bridge switch, the common half-bridge switch, and the output half-bridge switch are chosen sufficient to handle a voltage of the AC power source divided by a turns ratio reduction of the transformer.

9. The AC power converter according to claim 1, wherein the input low pass filter is operatively coupled to the common half-bridge switch and has filter characteristics sufficient to eliminate energy at the common switching frequency from entering the AC power source.

10. The AC power converter according to claim 1, wherein the DC power holding source is chosen from the group consisting of a capacitor, a super capacitor, and a battery.

11. A method of AC power conversion, the method comprising the steps of:

(a) providing an AC power converter for power converting from an AC power source to an AC load, AC power converter comprising:
   a. an input terminal from the AC power source;
   b. an input low pass filter operatively coupled to the input terminal and having filter characteristics to eliminate switching frequency energy from entering the AC power source;
   c. an input half-bridge switch operatively coupled to the input low pass filter and operating at a common switching frequency;
   d. a common half-bridge switch operatively coupled to the input low pass filter and operating at the common switching frequency;
   e. a DC power holding source operatively coupled to the input half-bridge switch and the common half-bridge switch;
   f. an output half-bridge switch operatively coupled to the DC power holding source and operating at the common switching frequency;
   g. an output low pass filter operatively coupled to the output half-bridge switch and having filter characteristics to eliminate switching energy of the common switching frequency from entering the AC load; and
   h. an output terminal operatively coupled from the output low pass filter to the AC load; and
(b) generating at least two control signals at the common switching frequency with a phase difference therebetween chosen to cause a ripple frequency in both the input low pass filter and the output low pass filter to be double the common switching frequency.

12. The method of AC power conversion according to claim 11, said step (b) of generating comprises a substep of (b)(1) generating a common half-bridge switch control signal to switch the common half-bridge switch.

13. The method of AC power conversion according to claim 11, wherein said step (a) of providing the common half-bridge switch further comprises a substep of providing another common half-bridge switch operatively to form a common full-bridge switch.

14. The method of AC power conversion according to claim 11, said step (b) of generating comprises a substep of (b)(1) generating at least three control signals comprising an input half-bridge switch control signal to switch the input half-bridge switch, a common half-bridge switch control signal to switch the common half-bridge switch, and an output half-bridge switch control signal to switch the output half-bridge switch.

15. The method of AC power conversion according to claim 14,
   wherein said step (b)(1) of generating comprises a substep of (b)(1)(i) generating the input half-bridge switch control signal and the common half-bridge switch control signal with a phase difference there between chosen to cause a ripple frequency in both the input low pass filter and the output low pass filter to be double the common switching frequency; and
   wherein said step (b)(1) of generating comprises a substep of (b)(1)(ii) generating the common half-bridge switch control signal and the output half-bridge switch control signal with a phase difference there between chosen to cause a ripple frequency in both the input low pass filter and the output low pass filter to be double the common switching frequency.

16. The method of AC power conversion according to claim 12,
   wherein said step (a) of providing further comprises a substep of (a)(1) providing a transformer operatively coupled between the AC power source and the input low pass filter; and
   wherein said step (a) of providing provides the output low pass filter operatively coupled in series with the AC power source and the output half-bridge switch.

17. The method of AC power conversion according to claim 16, wherein said step (a) of providing chooses voltage ratings of the input half-bridge switch, the common half-bridge switch, and the output half-bridge switch sufficient to handle a voltage of the AC power source divided by a turns ratio reduction of the transformer.

18. The method of AC power conversion according to claim 11, wherein said step (a) of providing further comprises the substep of providing the input low pass filter operatively coupled to the common half-bridge switch and having filter characteristics sufficient to eliminate energy at the common switching frequency from entering the AC power source.

\* \* \* \* \*